United States Patent Office 2,806,841
Patented Sept. 17, 1957

2,806,841

POLYMERS OF ALPHA-PIPERIDONE

Carl E. Barnes, Gloucester, William R. Nummy, Warren, and William O. Ney, Jr., Providence, R. I., assignors to Arnold, Hoffman & Co., Incorporated, Providence, R. I., a corporation of Rhode Island No Drawing. Application February 24, 1953,
Serial No. 338,555

5 Claims. (Cl. 260—78)

This invention relates to the production of new and useful organic polymers from α piperidone.

Heretofore the teachings in the literature have been to the effect that polymerization of this compound did not take place.

We have discovered that α piperidone can be successfully polymerized to produce a useful high molecular weight product which we identify as polypiperidone.

This discovery is unexpected because six-membered lactams were previously considered unpolymerisable, and consequently the method was tried on α piperidone, the simplest example. The compound was found to be more difficult to polymerize than a five-membered lactam e. g., pyrrolidone, and actually required the addition of a very strong activator to the potassium hydroxide treated reaction mixture. A polymeric substance exhibiting the properties of a polyamide was isolated and its composition confirmed by carbon, hydrogen and nitrogen analysis which approximated the theoretical values for a polymer of piperidone.

It is the object of this invention to provide a new polyamide based on α piperidone, and a method for its production.

Carefully purified α piperidone is treated with potassium hydroxide and a portion distilled under vacuum to insure removal of the water formed. An activator, e. g., an acyl halide such as acetyl chloride, pelargonyl chloride, stearolyl chloride, is then added in weight equivalent to 25 to 50 percent of the potassium hydroxide added originally. An immediate exothermic reaction occurs, the reaction mixture is treated with water and the insoluble polymer is isolated as a nearly-white powder. It can be melted and forms into a tough, horny mass on cooling. It has many of the desirable properties of polyamides. It is useful as a molding powder from which useful objects can be prepared by compression molding i. e., heat and pressure or pressure alone.

Example

Purified α piperidone, 71 parts, are treated with 1.5 parts potassium hydroxide pellets in a suitable vessel fitted for stirring, vacuum distillation, and an inlet for dry nitrogen gas when required. Piperidone, 15 parts, are removed by vacuum distillation.

The resulting reaction mixture remaining in the vessel, 57.5 parts, is treated with 0.7 parts of benzoyl chloride, under an atmosphere of dry nitrogen. The mixture sets up rapidly to a thick slurry. After standing for 24 hours, the slurry was thoroughly mixed with about five times its volume of water, and the insoluble polymer filtered off on a suction filter. The resulting nearly white powder is sucked dry and further dried in a vacuum oven at 70° C. A very satisfactory molding powder is thus produced. If desired the polymer may be removed from the filter as a dry cake or coarse granules.

This application is a continuation in part of our application No. 260,558, filed December 7, 1951, which describes the polymerization of five and six membered rings including delta valerolactam or α piperidone, and the polymer thereof may be employed as described in said application. The latter has now issued as U. S. Patent 2,638,463 of May 12, 1953.

This new polymer, as typified by polypiperidone, is produced either as a dry cake; in the form of coarse granules; or as a fine molding powder and has many desirable properties. For example, polypiperidone is thermoplastic. It may be combined with suitable fillers or extenders and other conventional constituents, e. g., plasticizers, solvents, pigments dyes, etc., and shaped; spread or cast as a film or surface coating; used as an impregnant, and can be extruded, for instance, as fibres or filaments and films or sheets. It may be solvent spun by either wet or dry spinning to form fibres.

Instead of potassium hydroxide, potassium itself may be employed as described in United States Patent 2,638,463 as well as sodium and lithium and corresponding salts of the various metals, e. g., carbonates as well as hydroxides and oxides of the alkali metals and all other catalysts all as described in our said application which is hereby incorporated as a part of this patent specification and disclosure.

In addition to the activator mentioned, benzoyl chloride, others may be employed as described in our application filed concurrently herewith and directed to the use of activators for speeding up and increasing the yield of the polymerization reaction.

The proportions described above are subject to variation as described in our said applications and as also described therein, the polymerization reaction is carried at temperatures between 0° and 300° C.

The polymerization may also be carried out in the presence of a non-solvent for the lactam monomer and polymer, e. g., petroleum ether, gasoline, etc., as described in the application of Ney and Crowther filed concurrently herewith, now U. S. Patent No. 2,739,959 which disclosure is hereby incorporated in the specification and disclosure of this application.

We claim:

1. Fiber-forming homo-polymers of α-piperidone consisting essentially of the recurring unit

2. The process which comprises polymerizing α-piperidone in the presence of an alkaline polymerization catalyst mixture comprising an inorganic alkaline substance and an acyl group containing activator therefor.

3. A process according to claim 2 wherein the activator is an acyl halide.

4. A filament comprising the polymer of claim 1.

5. A film comprising the polymer of claim 1.

References Cited in the file of this patent

UNITED STATES PATENTS

| | | |
|---|---|---|
| 2,293,388 | Hanford | Aug. 18, 1942 |
| 2,739,959 | Ney et al. | Mar. 27, 1956 |

FOREIGN PATENTS

| | | |
|---|---|---|
| 739,953 | Germany | Oct. 26, 1943 |

OTHER REFERENCES

Leimu et al: Suomen Kemistilehti, vol. 18B, pages 40 to 43, (1945).